US009753514B2

United States Patent
Hybertson et al.

(10) Patent No.: US 9,753,514 B2
(45) Date of Patent: Sep. 5, 2017

(54) APPARATUS AND METHOD FOR REDUCING POWER CONSUMPTION IN CUSTOMER PREMISES EQUIPMENT

(71) Applicant: Time Warner Cable Enterprises LLC, New York, NY (US)

(72) Inventors: Eric D. Hybertson, Longmont, CO (US); Dean E. Osborne, Thornton, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 15/004,928

(22) Filed: Jan. 23, 2016

(65) Prior Publication Data

US 2016/0147272 A1    May 26, 2016

Related U.S. Application Data

(63) Continuation of application No. 13/831,679, filed on Mar. 15, 2013, now Pat. No. 9,247,500.

(51) Int. Cl.
*G06F 1/30* (2006.01)
*H04W 52/02* (2009.01)
*G06F 11/07* (2006.01)
*H04L 12/12* (2006.01)

(52) U.S. Cl.
CPC .............. *G06F 1/30* (2013.01); *G06F 11/079* (2013.01); *G06F 11/0721* (2013.01); *H04L 12/12* (2013.01); *H04W 52/0225* (2013.01); *Y02B 60/50* (2013.01)

(58) Field of Classification Search
CPC .................................................. H04W 52/0225
See application file for complete search history.

(56) References Cited

U.S. PATENT DOCUMENTS

6,804,262 B1 * 10/2004 Vogel .................. H04L 12/2801
348/E17.001
2003/0056217 A1    3/2003 Brooks
(Continued)

OTHER PUBLICATIONS

"Cable modem" downloaded from http://en.wikipedia.org on Mar. 4, 2013, pp. 1-7.
(Continued)

*Primary Examiner* — Jae Y Lee
(74) *Attorney, Agent, or Firm* — Otterstedt, Ellenbogen & Kammer, LLP

(57) ABSTRACT

A power control apparatus for controlling power consumption in customer premises equipment (CPE) for use in a content and data distribution network includes a detector, operative to determine an operational status of a connection between the CPE and a headend in the content and data distribution network, and a controller coupled with the detector. The controller is operative to place the CPE in a first mode of operation when a power failure event is not present and the operational status is indicative of a loss of connectivity between the CPE and the headend. The apparatus further includes switching circuitry coupled with the controller. The switching circuitry is operative in the first mode to disable power to a first subset of functional modules in the CPE, to thereby reduce power consumption in the CPE.

18 Claims, 8 Drawing Sheets

(56) References Cited

U.S. PATENT DOCUMENTS

| | | | |
|---|---|---|---|
| 2004/0180702 A1* | 9/2004 | Hughes | H04W 52/0241 455/574 |
| 2005/0177855 A1 | 8/2005 | Maynard et al. | |
| 2006/0130107 A1 | 6/2006 | Gonder | |
| 2007/0217436 A1 | 9/2007 | Markley | |
| 2008/0018427 A1 | 1/2008 | Ezra et al. | |
| 2013/0191663 A1* | 7/2013 | Overcash | G06F 1/3209 713/320 |
| 2013/0312020 A1 | 11/2013 | Talbert | |
| 2014/0269470 A1 | 9/2014 | Hybertson | |

OTHER PUBLICATIONS

"DOCSIS 3.0 Cable Modems" downloaded from http://www.motorola.com on Mar. 4, 2013, p. 1.

* cited by examiner

APPARATUS AND METHOD FOR REDUCING POWER CONSUMPTION IN CUSTOMER PREMISES EQUIPMENT

CROSS-REFERENCE TO RELATED APPLICATION

This application is a continuation, under 37 CFR 1.53(b), of co-assigned U.S. patent application Ser. No. 13/831,679 of inventors Eric D. Hybertson et al., and claims the benefit thereof, said application Ser. No. 13/831,679 having been filed on Mar. 15, 2013, and entitled "APPARATUS AND METHOD FOR REDUCING POWER CONSUMPTION IN CUSTOMER PREMISES EQUIPMENT." The complete disclosure of the aforesaid application Ser. No. 13/831,679 is expressly incorporated herein by reference in its entirety for all purposes.

FIELD OF THE INVENTION

The present invention relates generally to the electrical, electronic, and computer arts, and more particularly relates to battery backup techniques.

BACKGROUND OF THE INVENTION

Formerly, a cable network was utilized solely for delivering entertainment; namely, television. With the advent of the Internet and the rise in demand for broadband two-way access, the cable industry sought new ways of exploiting its existing plant. Pure coaxial ("coax") cable networks were replaced with hybrid fiber networks (HFNs) using optical fiber from the headend to the demarcation with the subscriber coax (usually at a fiber node). Currently, a content-based network, a non-limiting example of which is a cable television network, may afford access to a variety of services besides television, including, for example, broadband Internet access, telephone/voice service, and the like.

With an ever-increasing availability of voice and data communications services over the cable network, many embedded multimedia terminal adapters (eMTAs), gateways, cable modems, and other customer premises equipment (CPE), are provided with a battery backup to help ensure against disruption of services. This is particularly important for life-line or other critical telephone and data services which utilize a cable network as a communications medium, rather than a traditional private branch exchange (PBX) telephone line. Thus, in the event of a power failure and connectivity remains operative, the battery backup provides power to the CPE to beneficially enable users to continue utilizing voice and/or data communications services over the cable network.

Unfortunately, the battery backup is only capable of supplying power for a limited period of time. Therefore, for extended power outages, such as, for example, during severe weather events, depending on the power requirements of the CPE, the battery backup may be depleted before connectivity is restored. In this scenario, the CPE is rendered inoperable even when connectivity is restored but the power loss remains.

SUMMARY OF THE INVENTION

Embodiments of the present invention provide a mechanism for detecting the status of connectivity between the CPE and cable service provider headend in the event of a power failure, and when connectivity is lost, reducing power consumption in the CPE by disabling at least a portion of one or more functional modules in the CPE, thereby beneficially conserving auxiliary (i.e., backup) power.

In accordance with one embodiment, a method is provided for reducing power consumption in CPE for use in a content and data distribution network. The method includes the steps of: determining an operational status of a connection between the CPE and a headend in the content and data distribution network; and when the operational status is indicative of a loss of connectivity between the CPE and the headend, placing the CPE in a first mode of operation, wherein in the first mode of operation, power to at least a portion of a first subset of functional modules in the CPE is disabled to thereby reduce power consumption in the CPE.

In accordance with another embodiment, a power control apparatus for controlling power consumption in CPE for use in a content and data distribution network includes a detector, operative to determine an operational status of a connection between the CPE and a headend in the content and data distribution network, and a controller coupled with the detector. The controller is operative to place the CPE in a first mode of operation when the operational status is indicative of a loss of connectivity between the CPE and the headend. The apparatus further includes switching circuitry coupled with the controller. The switching circuitry is operative in the first mode to disable power to at least a portion of a first subset of functional modules in the CPE, to thereby reduce power consumption in the CPE.

In accordance with yet another embodiment, an article of manufacture is provided including a computer program product. The computer program product includes a tangible computer-readable recordable storage medium, storing in a non-transitory manner computer readable program code. The computer readable program code includes: computer readable program code configured to determine an operational status of a connection between CPE for use in a content and data distribution network and a headend in the content and data distribution network; and computer readable program code which, when the operational status is indicative of a loss of connectivity between the CPE and the headend, is configured to place the CPE in a first mode of operation. In the first mode of operation, power to at least a portion of a first subset of functional modules in the CPE is disabled to thereby reduce power consumption in the CPE.

In accordance with still another embodiment, an apparatus includes means for determining an operational status of a connection between the CPE and a headend in the content and data distribution network, and means for placing the CPE in a first mode of operation when the operational status is indicative of a loss of connectivity between the CPE and the headend. In the first mode of operation, power to at least a portion of a first subset of functional modules in the CPE is disabled to thereby reduce power consumption in the CPE.

As used herein, "facilitating" an action includes performing the action, making the action easier, helping to carry out the action, or causing the action to be performed. Thus, by way of example only and without limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate the performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments enable the CPE to conserve power when connectivity between the CPE and the headend has been lost, which is particularly advantageous during a power failure.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Embodiments of the invention will be described herein in the context of an illustrative embedded multimedia terminal adapter (eMTA) and methods for advantageously conserving battery power in the eMTA during the occurrence of a power failure at the customer premises. It should be understood, however, that embodiments of the invention are not limited to the methods and/or apparatus shown. Rather, embodiments of the invention are more broadly applicable to conserving battery power in customer premises equipment (CPE) during a power failure in a variety of contexts.

Purely by way of example and not limitation, embodiments of the invention will be shown in the context of a cable multi-service operator (MSO) providing data and voice services as well as entertainment services. However, one or more embodiments are broadly applicable to any broadband network, non-limiting examples of which include an Internet Protocol (IP) network, fiber to the curb (FTTC) or fiber to the premises (FTTP) network, wireless broadband, and the like. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

Figure 1:
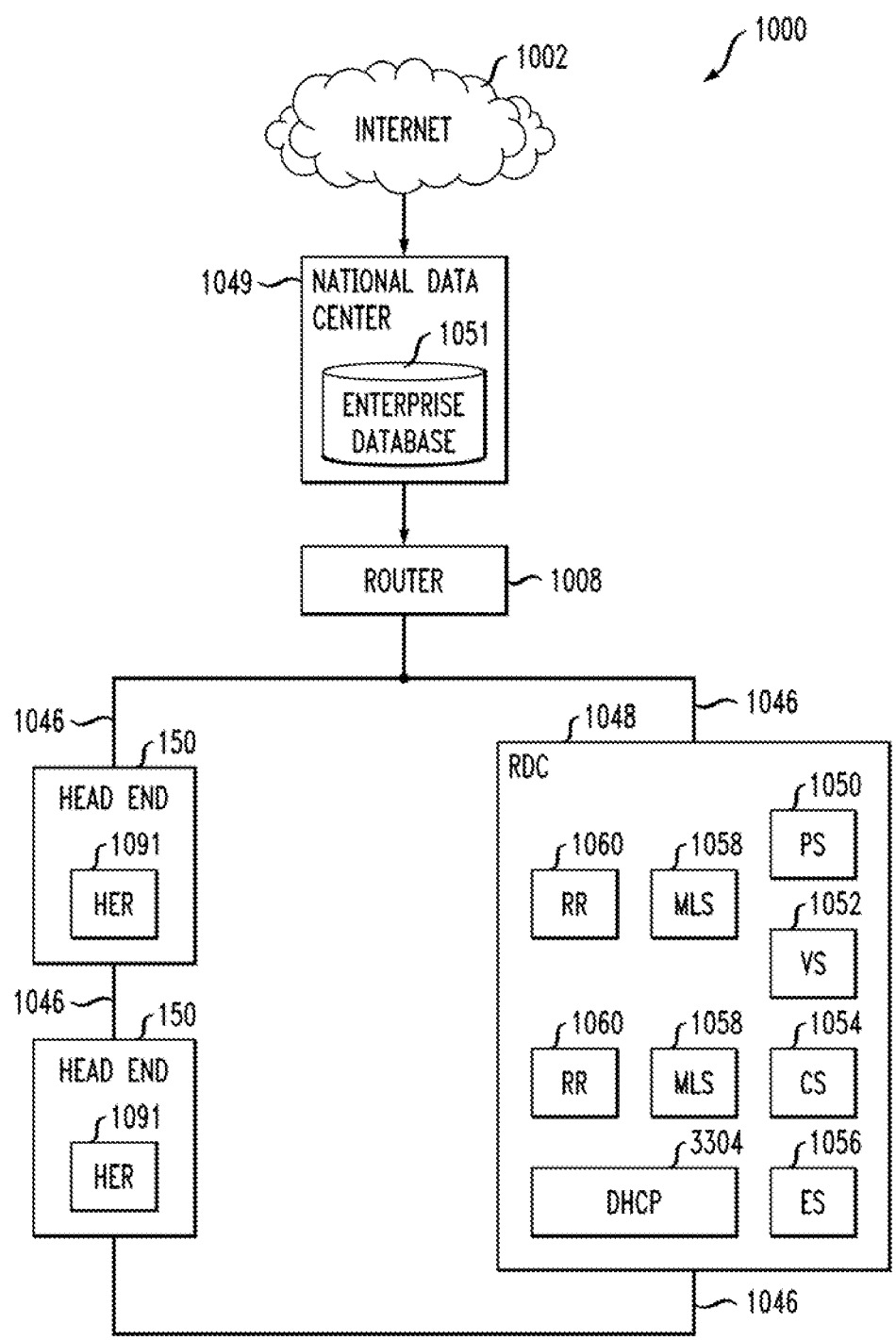
FIG. 1 is a block diagram of an exemplary embodiment of a system, within which one or more aspects of the invention can be implemented.

FIG. 1 is a block diagram depicting at least a portion of an exemplary system 1000 in which one or more aspects of the invention may be employed, according to an embodiment of the invention. System 1000 includes a regional data center (RDC) 1048, and one or more divisions, represented by division headends 150. RDC 1048 and headends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via a router 1008. In one or more embodiments, router 1008 is a point-of-presence ("POP") router; for example, of the kind available from Juniper Networks, Inc., Sunnyvale, Calif., USA.

Each of the headends 150 may include a headend router (HER) 1091, or alternative interface, which is adapted to communicate with the network 1046. Headend routers 1091 are omitted from subsequent figures merely for clarity and ease of description.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect and communicate with network 1046.

A national data center 1098 is provided in some instances; for example, between router 1008 and Internet 1002.

Figure 2:
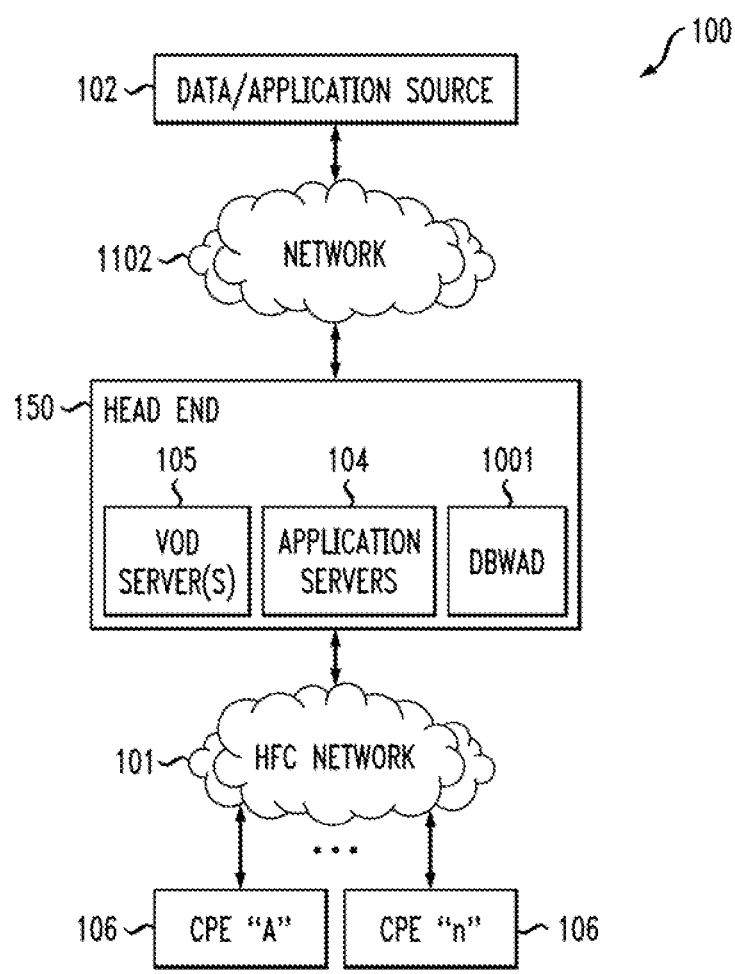
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include: (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD server(s) 105 and CPE(s) 106 are connected via a bearer (e.g., HFC) network 101. Servers 104, 105 can be located in the headend 150 as shown, although they are not limited to residing in the headend. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the headend architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., a redundant arrays of inexpensive disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill in the art, given the teachings herein. For example, in one or more embodiments, network 1102 may correspond to network 1046 of FIG. 1, and the data and application origination point may be, for example, within RDC 1048 or on the Internet 1002. Headend 150, HFC network 101, and CPEs 106 thus represent the divisions which were represented by division headends 150 in FIG. 1.

The application distribution server 104 preferably comprises a computer system where such applications can enter the network system. Distribution servers per se are well known in the networking arts, and accordingly are not described further herein.

The VOD server 105 preferably comprises a computer system where on-demand content can be received from one or more of the aforementioned data sources 102 and enter the network system. These servers may generate the content locally, or alternatively act as a gateway or intermediary from a remote (i.e., external) source.

The CPE 106 includes any equipment in the "customers' premises" (or other appropriate locations) that can be accessed by a distribution server 104 or a cable modem termination system, or the like. Non-limiting examples of CPE include set-top boxes (STBs), routers such as premises gateway routers, and high-speed cable modems for providing high-bandwidth Internet access in premises such as homes and businesses.

Figure 3:
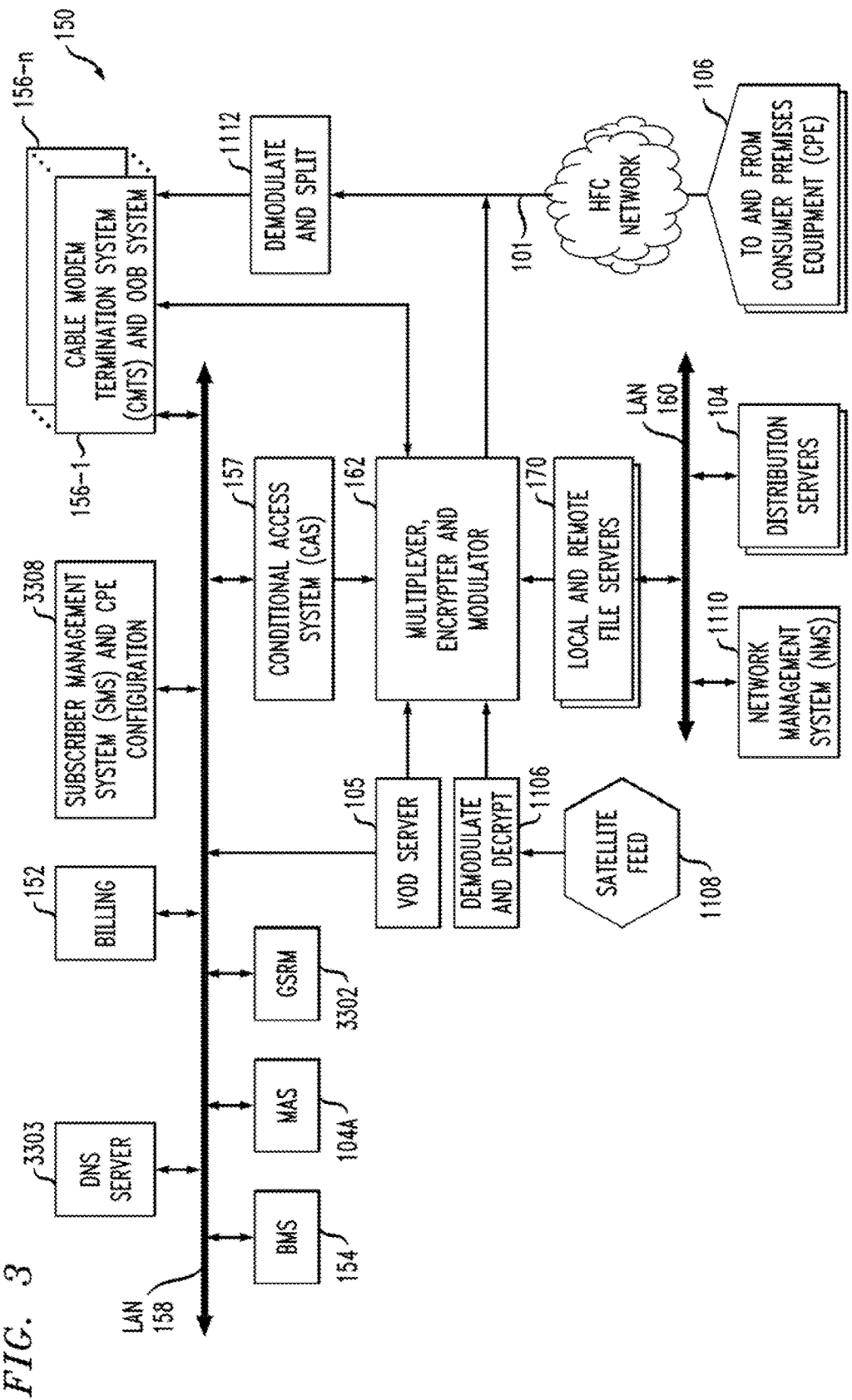
FIG. 3 is a functional block diagram illustrating one exemplary HFC cable network headend configuration, useful within the system of FIG. 1.

FIG. 3 is a functional block diagram illustrating one exemplary HFC cable network headend configuration, useful within the system of FIG. 1. As shown in FIG. 3, the headend architecture 150 comprises typical headend components and services including billing module 152, subscriber management system (SMS) and CPE configuration management module 154, cable-modem termination system (CMTS) and out-of-band (OOB) system 156, as well as local area networks (LANs) 158, 160, placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 3 represents a high-level, conceptual architecture, and that each MSO may have multiple headends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an IEEE 802.3z gigabit Ethernet device). Since information is typically carried across multiple channels, the headend should be adapted to acquire the information for the carried channels from various sources. Typically, the channels being delivered from the headend 150 to the CPE 106 ("downstream") are multiplexed together in the headend and sent to neighborhood hubs (refer to description of FIG. 4) via a variety of interposed network components.

Content (e.g., audio, video, etc.) is provided in each downstream (in-band) channel associated with the relevant service group. To communicate with the headend or intermediary node (e.g., hub server), the CPE 106 may use the OOB or DOCSIS channels and associated protocols. The Data Over Cable System Interface Standard (DOCSIS® standard) was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the "®" symbol, for convenience. The OpenCable™ Application Platform (OCAP) 1.0, 2.0, 3.0 (and subsequent) specification (Cable Television Laboratories, Inc.) provides for exemplary networking protocols both downstream and upstream, although embodiments of the invention are in no way limited to these approaches. The DOCSIS Set-top Gateway (DSG) Interface Specification, CM-SP-DSG-I19-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes. Yet further, the MoCA 1.0, 1.1, and 2.0 specifications, inclusive, available from the Multimedia over Coax Alliance (MoCA), are also expressly incorporated herein by reference in their entireties for all purposes.

It will also be recognized that multiple servers (broadcast, VOD, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different locations are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
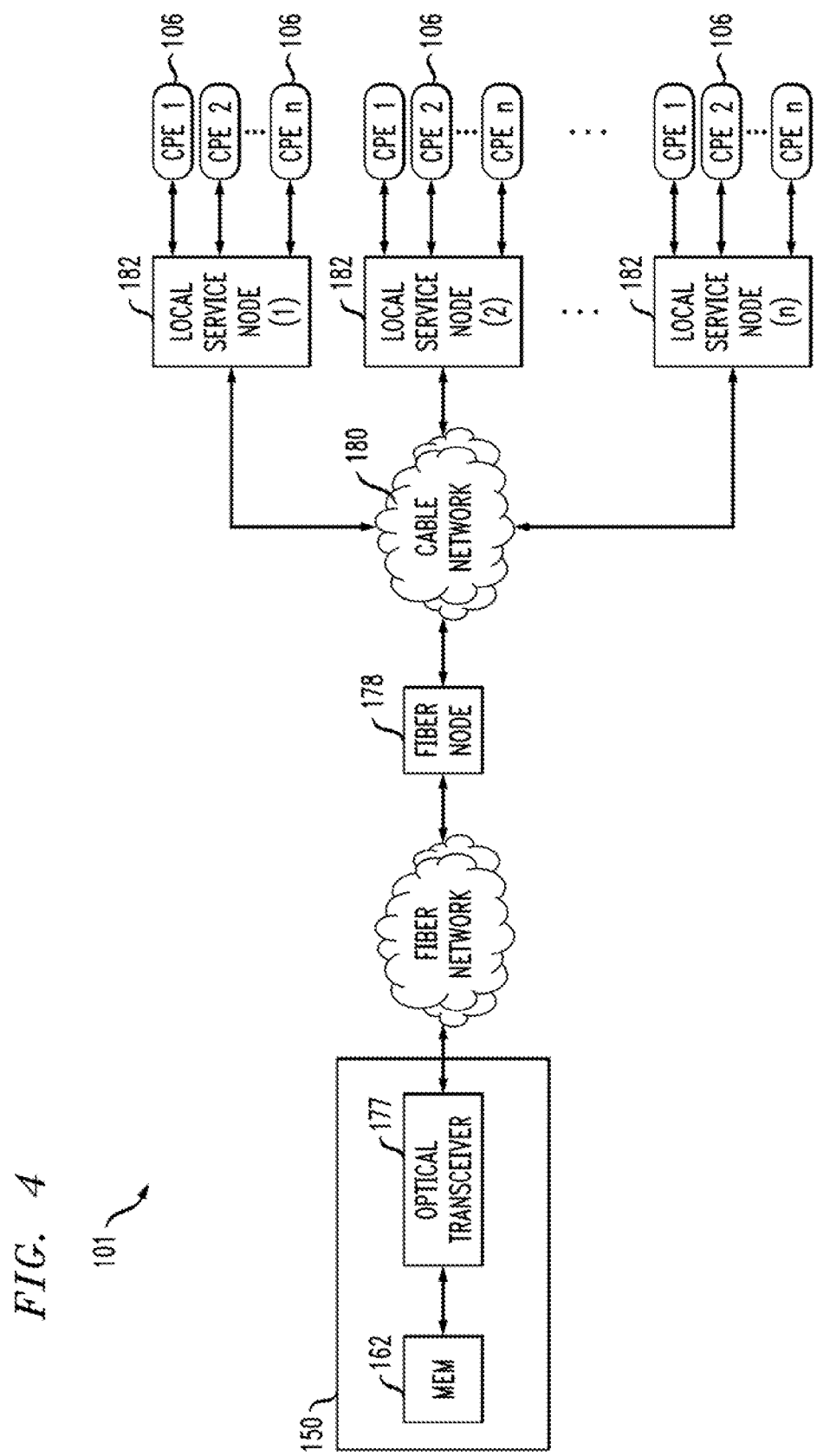
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the headend 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 also deliver Internet data and voice services using the Internet protocol (IP), although other protocols and transport mechanisms of the type well-known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. It is important to note that video transmitted via IP typically uses the aforementioned RF channels that are different than the RF channels used for the broadcast video (e.g., via quadrature amplitude modulation (QAM)) and audio.

Figure 5:
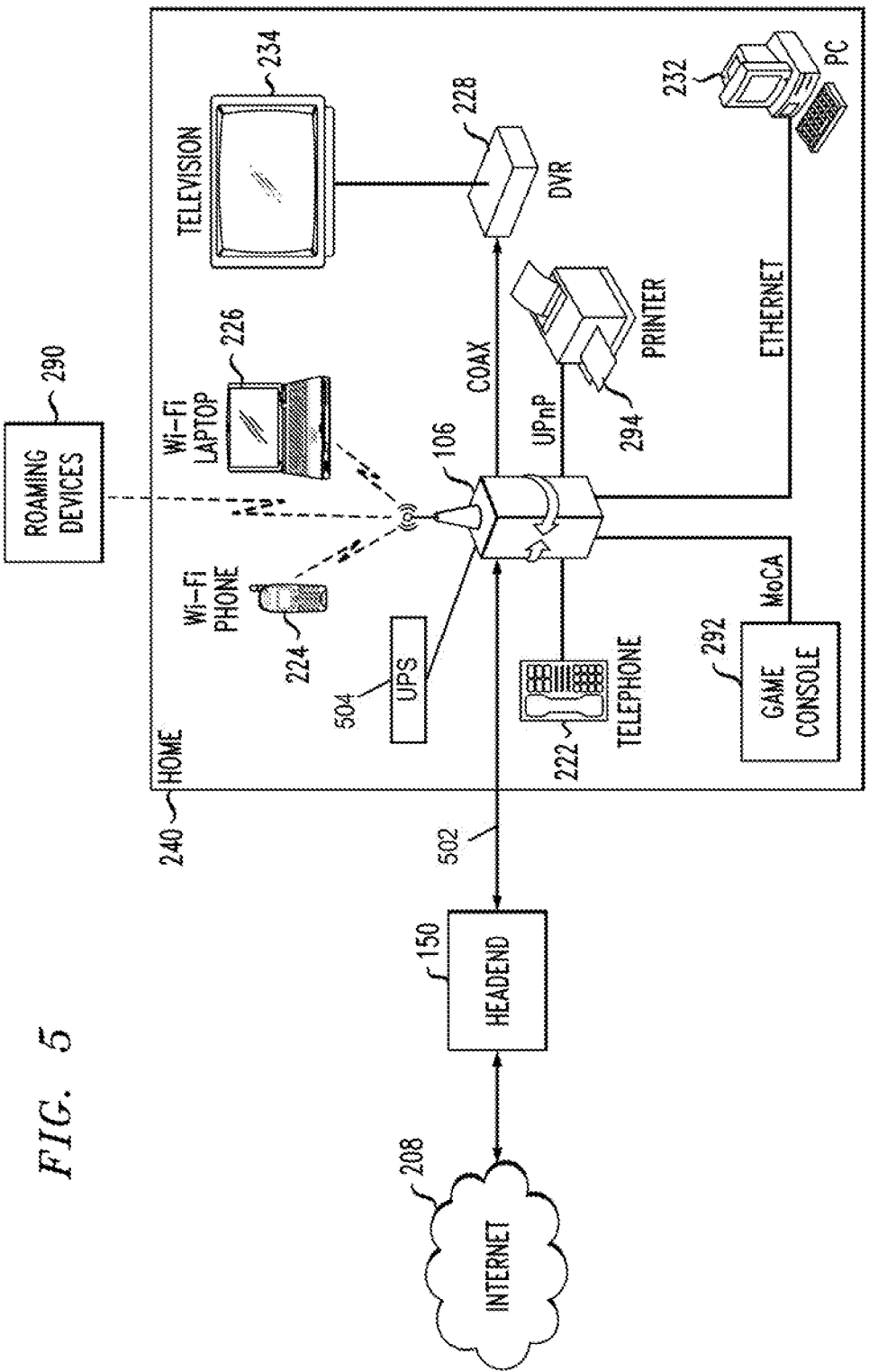
FIG. 5 is a functional block diagram depicting at least a portion of an exemplary content and data distribution network within which one or more aspects in accordance with embodiments of the invention are implemented.

Reference should now be had to FIG. 5, which presents a block diagram of a premises network interfacing with a headend of an MSO or the like, providing Internet access, according to an illustrative embodiment of the invention. An exemplary advanced wireless gateway comprising CPE 106 is depicted as well.

CPE 106, in this illustrative embodiment, includes an advanced wireless gateway which connects to a headend 150 or other hub of a network, such as a video content network of an MSO or the like, via a connection 502 established between the headend and CPE. The headend 150 is also coupled to an internet 208 (e.g., the Internet 1002 shown in FIG. 1), or an alternative network, which is located external to the headend 150, such as via an Internet (IP) backbone or gateway (not explicitly shown).

The headend 150 is, in the illustrated embodiment, coupled to multiple households or other premises, including the exemplary illustrated household 240, via corresponding connections 502 established therebetween. In particular, the headend 150 (for example, a cable modem termination system thereof) is coupled via the aforementioned HFC network and local coaxial cable or fiber drop to the premises (e.g., household 240), including the consumer premises equipment (CPE) 106. The exemplary CPE 106 is in signal communication with any number of different devices including, e.g., a wired telephony unit 222, a Wi-Fi (e.g., any wireless local area network (WLAN) product based on IEEE 802.11 standards) or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

CPE 106 is optionally also in signal communication with one or more roaming devices, generally represented by block 290.

A home local area network (HLAN) is created in the exemplary embodiment, which may include, for example, the network formed over the installed coaxial cabling in the premises 240, the Wi-Fi network (which can extend outside the premises), and so forth.

During operation, the CPE 106 exchanges signals with the headend 150 over the connection 502, which may include the interposed coax (and/or other, e.g., fiber) bearer medium. The signals include, e.g., Internet traffic, digital programming and other digital signaling or content such as digital (packet-based; e.g., Voice-over-IP (VoIP)) telephone (including video telephone) service. The CPE 106 then exchanges this digital information after demodulation and any decryption (and any de-multiplexing) to the particular system(s) to which it is directed or addressed. For example, in one embodiment, a media access control (MAC) address or IP address can be used as the basis for directing traffic within the client-side environment 240.

Any number of different data flows may occur within the network depicted in FIG. 2. For example, the CPE 106 may exchange digital telephone signals from the headend 150, via connection 502, which are further exchanged with the telephone unit 222, the Wi-Fi phone 224, or one or more roaming devices 290. The digital telephone signals may be IP-based, such as VoIP, or may utilize another protocol or transport mechanism. The well-known session initiation protocol (SIP) may be used, for example, in the context of a "SIP phone" for making multimedia calls. The network may also interface with a cellular or other wireless system, such as, for example, a third generation (3G) IMS (IP multimedia subsystem) system, in order to provide multimedia calls between a user or consumer in the household domain 240 (e.g., using a SIP phone or H.323 terminal) and a mobile 3G or fourth generation (4G) telephone or personal media device (PMD) user via that user's radio access network (RAN).

The CPE 106 may also exchange Internet traffic (e.g., TCP/IP and other packets) with the headend 150, via connection 502, which is further exchanged with the Wi-Fi laptop 226, the PC 232, one or more roaming devices 290, or other device(s). The CPE 106 may also receive digital programming that is forwarded to the DVR 228 or to the television 234. Programming requests and other control information may be received by the CPE 106 and forwarded to the headend 150 as well for appropriate handling.

In order to help ensure against disruption of service in the event of a power failure at the premises 240, an uninterruptable power source/supply (UPS) 504 (e.g., battery) is connected with the CPE 106, and may also be connected with one or more other devices in the premises (e.g., telephone 222), for maintaining a continuous supply of power to the connected device(s) during the power failure. As used herein, the term "uninterruptable power source/supply" is intended to broadly refer to any power source, for example, a battery, that is not affected by the disruption of main power (e.g., electricity) to the premises, with or without internal power failure detection circuitry. Thus, a UPS 504 may be implemented as a simple battery, according to embodiments of the invention; in other embodiments, the UPS may be implemented as a device including a battery, power failure detection circuitry and switching circuitry (e.g., to switch its output from main power to its internal battery source). Furthermore, it is to be understood that although the UPS 504 is shown conceptually as a separate functional module residing outside the CPE 106, the UPS is preferably integrated within the CPE, according to embodiments of the invention. Of course, this does not preclude other arrangements in which the UPS 504 resides externally to the CPE 106.

Although there are various types of UPS configurations, in a basic standby configuration of UPS 504, during normal operation the UPS is powered from a commercial source of electricity (e.g., mains power from a utility company, or the like) to which it is connected and provides pass-through power to the CPE 106. As the UPS 504 accepts incoming electricity, it also charges its internal energy-storing element for use at a later time. The energy-storing element in the UPS 504 is typically implemented in the form of a battery (or array of batteries), although other implementations of the energy-storing element are contemplated (e.g., capacitor, flywheel, etc.). In other embodiments (e.g., an online UPS configuration), the CPE 106 is powered directly from the internal storage battery in the UPS 504. The input voltage from the mains power is passed through a battery charger to the battery, and the output from the battery is sent through a DC-AC inverter in the UPS 504 to ensure that the power supplied to the CPE 106 is as clean as possible.

When a power failure occurs, such as when a loss of mains power is detected, the UPS 504, in a basic standby embodiment, provides emergency power (e.g., from its internal storage battery) to the connected device(s), such as CPE 106. Specifically, when the incoming voltage falls below a prescribed level, the UPS 504 turns on the internal DC-AC inverter circuitry therein which is powered from its internal storage battery. The UPS 504 then switches (e.g., mechanically) the connected equipment from the primary power supply (e.g., mains power) onto its DC-AC inverter output. The switchover time is nearly simultaneous (e.g., about 20-30 milliseconds), depending on the amount of time it takes for the UPS 504 to detect the loss of power and to switch from its normal operational mode to a battery backup mode. The battery within the UPS 504 may continue providing power for several minutes or even several hours, depending on the size and type of the UPS and the load connected thereto. As the energy stored in the UPS 504 is depleted, the electrical output expires and the connected device(s) loses power.

Figure 6:
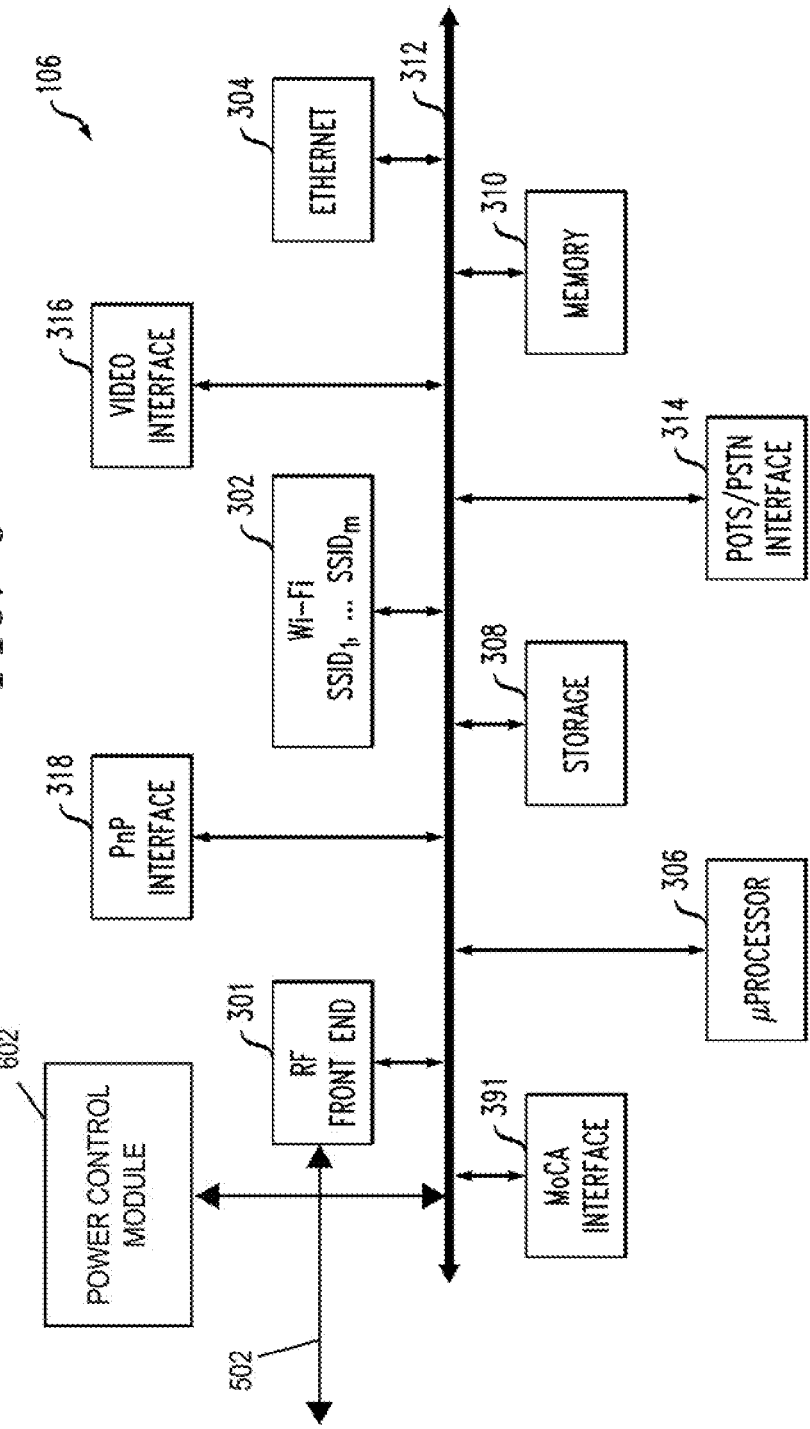
FIG. 6 is a functional block diagram depicting at least a portion of an exemplary centralized CPE unit suitable for use in the network of FIG. 5, according to an embodiment of the invention.

With reference now to FIG. 6, a block diagram depicts at least a portion of one exemplary implementation of the CPE 106 shown in FIG. 5, according to an embodiment of the invention. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled with a bus 312. In one or more embodiments, the RF front end 301 is physically connected with the headend (150 in FIG. 5) via connection 502, and is logically connected with one or more other functional modules in the CPE 106 (e.g., Wi-Fi interface 302, video interface 316, "Plug n' Play" (PnP) interface 318, Ethernet interface 304, microprocessor 306, storage unit 308, plain old telephone service (POTS)/public switched telephone network (PSTN) interface 314, memory unit 310, MoCA interface 391, and power control module 602) via bus 312.

In one or more embodiments, Wi-Fi interface 302 comprises a single wireless access point (WAP) running multiple ("m") service set identifiers (SSIDs). In one or more embodiments, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these SSIDs is on a separate IP subnetwork for security, accounting, and policy reasons. Thus, one or more SSIDs can be set aside for the home network while one or more SSIDs can be set aside for roaming devices 290 (see FIG. 5).

As previously stated, microprocessor 306, storage unit 308, POTS/PSTN interface 314, memory unit 310, and a suitable MoCA interface 391 are directly or indirectly coupled with the exemplary bus 312. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The CPE 106 further comprises a power control module 602 coupled, either directly or indirectly, with the bus 312. As will be described in further detail below, the power control module 602 is logically connected with one or more other functional blocks in the CPE 106, such as, for example, RF front end 301, Wi-Fi interface 302, Ethernet interface 304, microprocessor 306, storage unit 308, memory unit 310, POTS/PSTN interface 314, video interface 316, PnP interface 318, and/or MoCA interface 391, either directly or logically (e.g., through bus 312). The power control module 602 is operative to selectively control power to one or more of the connected functional blocks.

The illustrated CPE 106 can assume literally any discrete form factor, including those adapted for desktop, floor-standing, or wall-mounted use, or alternatively may be integrated, in whole or in part (e.g., on a common functional basis), with other devices if desired. Furthermore, every embodiment need not necessarily have all the elements shown in FIG. 6. For example, in some embodiments, the network does not provide QAM video to the premises and instead of unit 106 there is a simple cable modem or DSL modem for providing broadband IP data services, via which IP-based video is viewed. In a voice services application, according to other embodiments, the CPE 106 comprises an eMTA (e.g., DOCSIS3 eMTA).

It will become apparent that while a linear or centralized bus architecture is shown as the basis of the exemplary embodiment of FIG. 6, other bus architectures and topologies may be used. For example, a distributed or multi-stage (e.g., hierarchical) bus architecture may be employed. Similarly, a "fabric" or other mechanism (e.g., crossbar switch, RapidIO interface, non-blocking matrix, time division multiple access (TDMA) or multiplexed system, etc.) may be used as the basis of at least a portion of the internal bus communications within the device. Furthermore, many if not all of the foregoing functions may be integrated into one or more integrated circuit (IC) devices in the form of an application-specific integrated circuit (ASIC) or system-on-chip (SoC). Various other architectures well known to those in the data processing and computer arts may accordingly be employed.

It will also be recognized that the CPE configuration shown is essentially for illustrative purposes only, and various other configurations of the CPE 106 are consistent with other embodiments of the invention. For example, the CPE 106 in FIG. 6 may not include all of the elements shown, and/or may include additional elements and interfaces such as, for example, an interface for the HomePlug A/V standard which transmits digital data over power lines, a PAN (e.g., IEEE 802.15), Bluetooth, or other short-range wireless interface for localized data communication, etc. Again, every embodiment need not necessarily have all the elements shown in FIG. 6.

A suitable number of standard 10/100/1000 Base-T Ethernet ports for the purpose of an HLAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software can control the operation of other components, and provides various other functions within the CPE 106. Other system software/firmware may also be externally reprogrammed, such as using a download and reprogramming of the contents of flash memory, replacement of files on the storage device or within other non-volatile storage, etc. This allows for remote reprogramming or reconfiguration of the CPE 106 by the MSO or other network agent.

The RF front end 301 of the exemplary embodiment comprises an eMTA, or alternative cable modem, of a type known in the art for providing voice and data communications, among other functions. An eMTA is essentially a cable modem and a VoIP adapter bundled into a single device. In this fashion, content or data normally streamed over a cable network (or other communication network) can be received and distributed by the CPE 106, such as, for example, voice data or packetized video (e.g., IPTV). The digital data exchanged with the headend (e.g., via connection 502) using RF front end 301 includes IP or other packetized protocol traffic that provides access to Internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment (e.g., customer premises 240 shown in FIG. 5), or outside this environment by way of a gateway or portal, via, e.g. the Wi-Fi interface 302, Ethernet interface 304 or PnP interface 318.

It will be appreciated, however, that the RF front end 301 of the CPE 106 may comprise (either in addition to or in place of the eMTA) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, voice data associated with telephony communications and the like, MPEG-2 encoded programming data that is forwarded to a television monitor via the video interface 316, DOCSIS commands, etc. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem (which may be incorporated in the RF front end 301) for delivery of traditional broadband Internet services. To facilitate communication with the headend (150 in FIG. 5), the bus 312 in CPE 106 is logically connected, through the RF front end 301, with connection 502 (see FIG. 5). In this manner, connection 502 can be shared by all Internet devices in the premises 240 through the CPE 106; e.g. Internet protocol television (IPTV) devices, PCs, laptops, etc., as well as by roaming devices 290 (see FIG. 5). In addition, the CPE 106 can be remotely managed (such as from the headend 150 via connection 502, or another remote network agent) to support appropriate IP services.

In some instances the CPE 106 also creates an HLAN utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver voice, data and applications to other devices in the home such as telephones, PCs, PMDs, media extenders and set-top boxes. The coaxial network is merely the bearer; devices on the network utilize Ethernet or other comparable networking protocols over this bearer.

In accordance with embodiments of the invention, the exemplary CPE 106 shown in FIGS. 5 and 6 acts as a Wi-Fi access point (AP), thereby allowing Wi-Fi enabled devices to connect to the home network (e.g., HLAN) and access Internet, media, cellular phone service, and other resources on the network.

A premises gateway software management package (application) is also provided to control, configure, monitor and provision the CPE 106 from the cable headend (e.g., via connection 502) or other remote network node via the cable modem (DOCSIS) interface. This control allows a remote user to configure and monitor the CPE 106 and home network.

The MoCA interface 391 can include, for example, a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface). The CPE 106 also optionally includes a switched packet interface between the Ethernet port and the MoCA interface. In one embodiment, data traffic flows through the CPE 106 between the Ethernet or other network interface and MoCA ports. In some cases, this occurs without requiring host processor intervention; in other instances, host processor intervention is a possibility. The CPE 106 may include switched or routed processing between, e.g., Ethernet and/or MoCA and/or Wi-Fi, without limitation. In other words, it is possible for two (or more) Ethernet ports to be switched, meaning the gateway only looks at the layer two address to forward out the correct interface, or bridged, meaning the gateway forwards all packets from all Ethernet ports out all Ethernet ports, or routed, meaning the gateway examines the destination IP address to determine which port to forward.

In the event of a power failure at the customer premises and connectivity between the CPE 106 (e.g., eMTA, DOCSIS modem, etc.) and the content/service provider headend remains operative (i.e., active), a UPS (e.g., UPS 504 shown in FIG. 5) provides auxiliary power (e.g., emergency, supplemental or backup power) to the CPE to beneficially enable users to continue utilizing voice, data and/or multimedia communications services over the cable network. Sometimes, however, connectivity between the CPE 106 and the headend is lost during at least a portion of the power failure event, such as, for example, during severe weather or equipment failure. In this scenario, even though the CPE 106 is consuming power from the UPS 504, the CPE remains inoperable until connectivity is restored; consequently, battery power is being drained unnecessarily.

Unfortunately, the UPS 504 is only capable of supplying auxiliary power for a limited period of time. Thus, for extended power outages, depending on the power requirements of the CPE 106, the UPS 504 may be depleted before connectivity between the headend 150 and the CPE is restored. In this instance, the CPE 106 is rendered inoperable even when connectivity is eventually re-established but the power outage remains.

In accordance with an aspect of the invention, the power control module 602 in the CPE 106 is operative to detect when connectivity with the headend 150 is lost or otherwise unavailable and to disable (or reduce, to the extent possible) power to one or more functional modules in the CPE or otherwise place at least a portion of the one or more functional blocks into a sleep mode of operational, thereby reducing overall power consumption in the CPE, an consequently extending battery life. One justification for this beneficial approach is that without a functioning connection between the headend 150 and the CPE 106, the CPE is essentially inoperable anyway regardless of whether it is powered or not. Consequently, powering down or placing into sleep mode at least a portion of the CPE 106 until the connection 502 has been re-established conserves valuable battery power which can otherwise be used for life-line or other critical voice services once the connection with the headend is restored.

Figure 7:
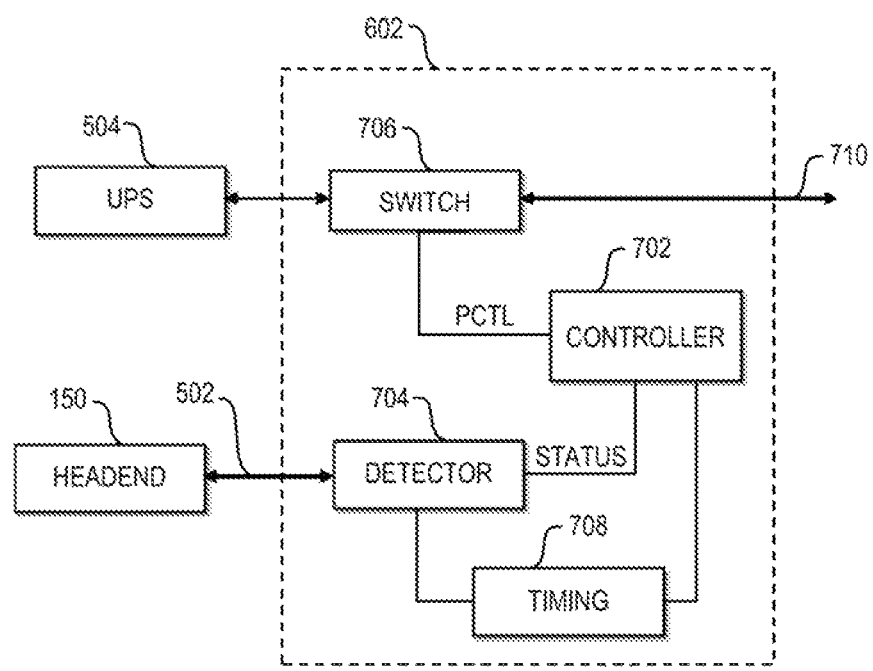
FIG. 7 is a block diagram depicting at least a portion of an exemplary power control module suitable for use in the illustrative CPE shown in FIG. 6, according to an embodiment of the invention.

FIG. 7 is a block diagram depicting at least a portion of an exemplary power control module 602 suitable for use in the illustrative CPE 106 shown in FIG. 6, according to an embodiment of the invention. With reference to FIG. 7, the power control module 602 comprises a controller 702, a detector 704, switching circuitry 706 and timing circuitry 708. The controller 702 is coupled with the detector 704, switching circuitry 706 and timing circuitry 708. Although depicted as separate functional modules, each of which may be implemented in hardware, software, or a combination of hardware and software, it is to be appreciated that one or more of the functional modules may be combined, either with one another or with one or more other modules. For example, in one embodiment, the switching circuitry 706 is combined into the controller 702 to form a module which incorporates the respective functions of both the controller and switching circuitry. Likewise, the detector 704 and the controller 702 may be combined to form a module which incorporates the respective functions of both the controller and detector, according to another embodiment.

The detector 704 is operative to determine (e.g., monitor) an operational status of the connection 502 to thereby establish whether connectivity between the headend 150 and the CPE is active (i.e., connectivity is operational) or inactive (i.e., connectivity has been lost). The detector 704 is further operative to generate a status signal (STATUS) which is indicative of a state (e.g., inactive or active) of the connection 502. The status signal is sent to the controller 702 which may initiate one or more prescribed actions in response thereto. The detector 704, in one or more embodiments, is operative to continuously monitor the connectivity status of the connection 502. In one or more other embodiments, the detector 704 is operative to periodically monitor the status of the connection 502 (e.g., once every five minutes or so). Periodic monitoring of connection status would have a benefit of reducing power consumption in the CPE, at the expense of receiving delayed connection status information. In still other embodiments, the frequency with which the detector 704 monitors the connection 502 is selectively controlled (e.g., programmed), such as by controller 702, as a function of one or more factors, including, for example, battery life of the UPS 504, the load connected to the UPS, whether a power failure is detected, etc.

By way of example only, according to one embodiment, during normal operation when main power is available, the power control module 602 configures the detector 704 to continuously monitor the connection 502, since no power-saving measures are necessary. However, when a power failure occurs, the power control module 602 is operative to power down the detector 704 and to wake up (i.e., power on) the detector for brief periods at prescribed intervals of time to periodically monitor the status of connection 502 before powering down the detector again, thereby conserving battery power.

The duration of the power-on period and/or the length of the intervals between power-on periods (i.e., power-off periods) of the detector 704, in this embodiment, are controlled by the timing circuitry 708, which preferably includes one or more timers or counters. The timing circuitry 708 may also provide a clock signal to the controller 702, or to other functional modules requiring a clock signal. The timing circuitry 708 preferably remains powered on (i.e., running), even while other circuitry (e.g., detector 704, controller 702, etc.) in the power control module 602 are placed in a sleep mode to thereby provide a mechanism for waking up portions of the power control module that have been powered off.

Embodiments of the invention are not limited to any specific methodology for detecting a loss of connection between the headend 150 and the CPE 106. For example, in accordance with one embodiment, the detector 704 is operative to monitor communications (e.g., data/voice traffic, DOCSIS channel carrier, OOB messaging signals, etc.) received by the CPE 106 from the headend 150. Specifically, in one or more embodiments, the detector 704 is operative to monitor the RF front end (301 in FIG. 6) to detect an energy (e.g., QAM signal) level on at least one channel for a service with which the RF front end is in communication (i.e., tuned/subscribed). When the QAM signal exceeds a prescribed threshold level, such as, for example, −15 dBmV (decibels relative to one millivolt), the detector 704 indicates that the connection between the headend and CPE is present. Alternatively, when the energy level on the monitored channel falls below the prescribed threshold level, the detector 704 indicates a loss of connection.

The detector 704 may be configured to detect a synchronization signal from the headend 150, according to one or more other embodiments. For applications in which the presence of an active connection is indicated by a prescribed DC voltage level on the connection 502, the detector 704 may be implemented as a voltage comparator, according to an embodiment of the invention.

In either of these illustrative scenarios for detecting the presence of the connection, when the detector 704 fails to receive an expected signal from the headend 150 indicative of an active connection (e.g., QAM signal level, synchronization signal, DC voltage, or other signal) within a prescribed period of time (e.g., 30 seconds), the detector assumes that the connection has failed (i.e., connectivity has been lost). When a connection failure has been detected, the detector 704 changes a state (e.g., from logic "0" to logic "1") of the status signal sent to the controller 702 accordingly.

The controller 702, which may comprise a microprocessor running prescribed software, a state machine, etc., is operative to receive the status signal from the detector 704 and to initiate an appropriate action in response thereto. For example, in one embodiment, when the status signal is indicative of a connection failure and a power failure is also detected, the controller 702 is operative to generate a control signal, PCTL, sent to the switching circuitry 706, which causes the switching circuitry to place one of more functional modules (e.g., RF front end 301, MoCA interface 391, Wi-Fi interface 302, etc.) in the CPE 106 into a power-down (i.e., "sleep") mode of operation via a power control connection 708. The power control connection 708 is preferably implemented as a power bus supplying power to the one or more functional modules in the CPE coupled to the power control connection. The switching circuitry 706 may also place one or more functional modules within the power control module 602 (e.g., detector 704) in a sleep mode.

The power control module 602 is operative to detect a loss of primary power occurring from a power failure event. For example, this power failure detection function may be incorporated into the detector 704, such as by utilizing a voltage comparator or other known detection means. Similarly, according to one or more embodiments, the loss of primary power may be communicated to the power control module 602 by detection circuitry external to the power control module, such as from the UPS 504. A UPS generally includes such power failure detection functionality for determining when to switch from primary power to its internal DC-AC inverter output.

During a power failure event, when the detector 704 determines that the connection 502 is active (i.e., connectivity is present), the controller 702 is operative in a first mode, which may be referred to herein as a battery mode, to configure the switching circuitry 706, via control signal PCTL, as a pass-through element, supplying power from the UPS 504 to at least a portion of a first subset of the connected functional modules in the CPE 106. In the battery mode, one or more of the connected modules in the CPE may be configured such that not all available features are fully functional. For instance, in one or more embodiments, an eMTA operating in battery mode would not turn on its wireless module, to thereby reduce power consumption.

When primary power is available, the controller is operative in a second mode, which may be referred to herein as a normal mode, to configure the switching circuitry to connect power to the power control connection 708 regardless of whether or not there is connectivity between the headend 150 and the CPE 106 (i.e., regardless of the state of control signal PCTL generated by the controller 702), according to one or more embodiments. In one or more other embodiments, the switching circuitry 706 may be configured to disable power to one or more of the connected functional modules in the CPE whenever a loss of connectivity between the headend and the CPE is detected, regardless of whether or not there is a power failure.

During a power failure event, when the detector 704 determines that the connection 502 has been lost (i.e., connectivity has failed or is otherwise inactive), the controller 702 is operative in a third mode, which may be referred to herein as a sleep mode, to configure the switching circuitry 706, via control signal PCTL, to disable power to at least a portion of a second subset of the connected functional modules in the CPE. In the sleep mode, since no connection is present, most or all of the functional modules in the CPE may be turned off; only critical functional modules, or portions thereof, such as the power control module 602 and RF front end (301 in FIG. 6) may remain powered on. And even in these critical functional modules, unused circuitry can be powered off to further conserve battery life. For example, in the power control module 602, the controller 702 and detector 704 may be powered off during sleep mode, while the timing circuitry 708 remains powered on to provide a wake-up signal to the controller and detector for periodically testing connectivity in the CPE. Thus, in one or more embodiments, the second subset of functional modules in the CPE which are powered off during sleep mode will be greater compared to the first subset of functional modules in the CPE which are powered off during battery mode.

Figure 8:
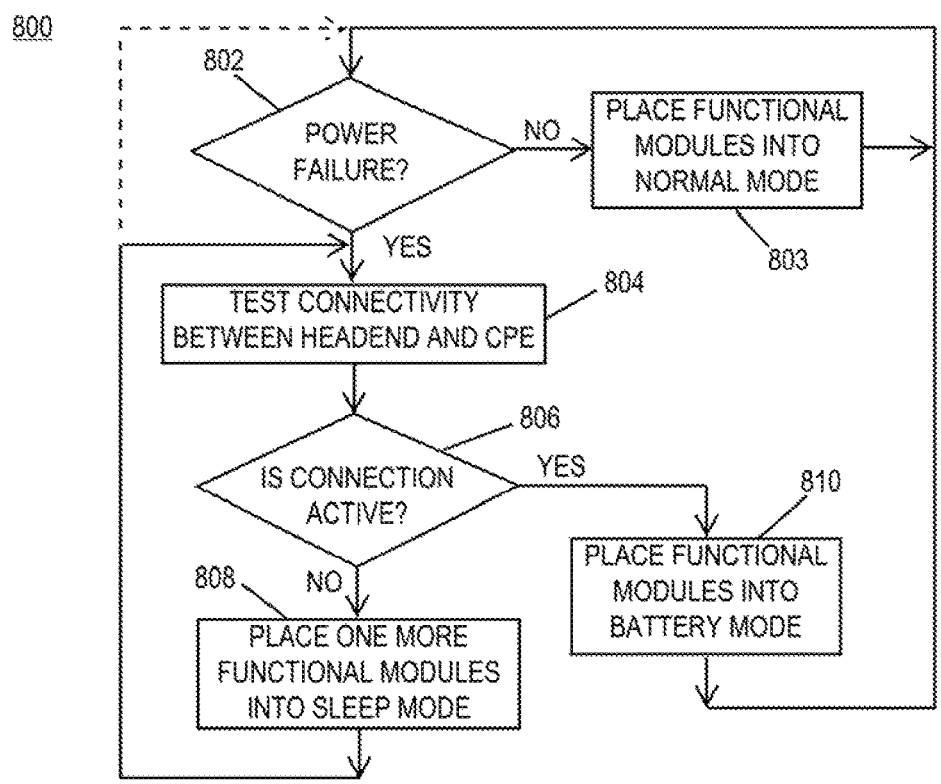
FIG. 8 depicts an exemplary method for reducing power consumption in the CPE, according to an embodiment of the invention.

FIG. 8 depicts an exemplary method 800 for reducing power consumption in the CPE, according to an embodiment of the invention. At least a portion of the exemplary method 800 is performed in the controller 702 of the power control module 602 shown in FIG. 7. Step 802 of method 800 checks to see if a power failure event has occurred at the premises. When a power failure has not been detected, the CPE continues its normal operation by placing the functional modules in the CPE into normal mode in step 803 (if the modules are not already in normal mode), since there is no need to conserve battery power. Method 800 then continues to monitor for a power failure in step 802.

When a power failure has been detected, step 804 tests for connectivity between the headend and the CPE to determine whether the connection therebetween remains active (i.e., functional). When it is determined, in step 806, that the connection between the headend and the CPE has failed, one or more functional modules in the CPE (e.g., RF front end 301, Wi-Fi interface 302, Ethernet interface 304, microprocessor 306, POTS/PSTN interface 314, video interface 316, PnP interface 318, MoCA interface 391) are placed into a sleep (i.e., power off) mode of operation in step 808 to conserve battery power. For example, the Wi-Fi and/or MoCA interfaces (302 and 391, respectively, in FIG. 6) are powered off. The method 800 then proceeds to check connectivity again at step 804, either immediately or during prescribed intervals of time (e.g., every few minutes). This connectivity testing loop (comprising steps 804 and 806) continues, in accordance with one or more embodiments, until the connection between the headend and CPE is restored.

When, in step 806, it is determined that the connection between the headend and the CPE is active and main power has not yet been restored (i.e., the power failure remains), at least a portion of the functional modules in the CPE are powered on and placed into a battery mode of operation in step 810. Since, at this point, power has not returned to the premises and therefore battery conservation is still required, certain functional aspects of one or more blocks will remain powered off. For example, in an eMTA application, circuitry responsible for providing wireless functionality may remain turned off. By way of example only and without limitation, for a DOCSIS3 eMTA with an 8×4 front end (i.e., eight downstream tuners and four upstream transmitters), the device would operate in 1×1 mode (i.e., only using one downstream tuner and one upstream transmitter). After placing the functional modules in battery mode in step 810, the method 800 resumes at step 802 to monitor the status of power at the premises.

In an alternative embodiment, rather than returning to step 804 after placing the one or more modules into sleep mode in step 808, method 800 may return to step 802 to determine if power has been restored at the premises. This approach may be beneficial for activating the functional blocks, such as the Wi-Fi interface (302 in FIG. 6), that can be used even when a connection between the CPE and the headend is unavailable, since power conservation is no longer necessary.

System and Article of Manufacture Details

The invention can employ hardware aspects or a combination of hardware and software aspects, as previously stated. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 9:
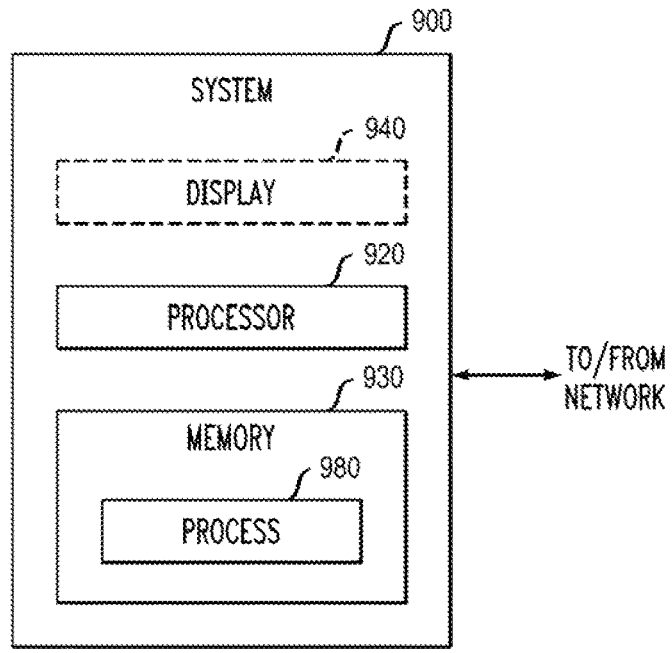
FIG. 9 is a block diagram depicting an exemplary system configurable for implementing at least some aspects of the invention, according to an embodiment of the invention.

FIG. 9 is a block diagram of a system 900 that can implement at least some aspects of the invention, and is representative, for example, of one or more of the servers shown in the figures. The processor, memory, and process are also representative of aspects of the functionality of the exemplary power control module 602 shown in FIGS. 6 and 7. As shown in FIG. 9, memory 930 configures the processor 920 to implement one or more methods, steps, and functions (collectively, shown as process 980 in FIG. 9). The memory 930 could be distributed or local and the processor 920 could be distributed or singular. Different steps could be carried out by different processors (e.g., concurrently, when applicable).

The memory 930 could be implemented as an electrical, magnetic or optical memory, or any combination of these or other types of storage devices. It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC rather than using firmware. Display 940 is representative of a variety of possible input/output devices (e.g., keyboards, monitor, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 900 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal. The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods (e.g., method 800 shown in FIG. 8) or claims set forth herein when such program is run, for example, on controller 702 (FIG. 7), and the like, and that such program may be embodied on a tangible computer readable recordable storage medium.

As used herein, including the claims, a "server" includes a physical data processing system (for example, system 900 as shown in FIG. 9) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g., power control module 602 shown in FIGS. 6 and 7). The method steps can then be carried out using the distinct software modules of the system, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for reducing power consumption in customer premises equipment (CPE) for use in a content and data distribution network, the method comprising the steps of:
   determining, at the CPE, an operational status of a connection between the CPE and a headend in the content and data distribution network;
   determining, at the CPE, whether a power failure event is present at the CPE;
   when a power failure event is not present at the CPE and the operational status is indicative of a loss of connectivity between the CPE and the headend, placing the CPE in a first mode of operation, wherein in the first mode of operation, power to a first subset of functional modules in the CPE is disabled to thereby reduce power consumption in the CPE; and
   when the power failure event is present and when the operational status is indicative of a presence of connectivity between the CPE and the headend, placing the CPE in a second mode of operation, wherein in the second mode of operation, power to a second subset of functional modules in the CPE is disabled, the first subset of functional modules being greater than the second subset of functional modules.

2. The method of claim 1, further comprising:
   determining whether a power failure event is present at the CPE; and
   when the power failure event is present, powering the CPE from an uninterruptable power source.

3. The method of claim 1, wherein the step of determining an operational status of the connection between the CPE and the headend comprises monitoring at least one characteristic of the connection between the CPE and the headend.

4. The method of claim 1, wherein determining an operational status of the connection between the CPE and the headend comprises monitoring a front end in the CPE to detect an energy level on at least one channel for a service with which the front end is in communication.

5. The method of claim 1, wherein monitoring the front end comprises determining whether the energy level on the channel exceeds a prescribed threshold level.

6. The method of claim 1, wherein the energy level comprises a quadrature amplitude modulation signal level.

7. The method of claim 1, wherein determining an operational status of the connection between the CPE and the headend comprises monitoring at least one of communications received by the CPE from the headend, and monitoring a synchronization signal from the headend.

8. The method of claim 7, wherein the communications received by the CPE from the headend comprises at least one of data traffic, voice traffic, a Data Over Cable System Interface Standard (DOCSIS) channel carrier, and out-of-band messaging signals.

9. The method of claim 1, wherein the step of determining an operational status of the connection between the CPE and the headend comprises periodically monitoring at least one characteristic of the connection between the CPE and the headend.

10. The method of claim 9, wherein periodically monitoring at least one characteristic of the connection between the CPE and the headend comprises at least one of controlling an amount of time the connection is monitored and controlling an amount of time between successive connection monitoring intervals.

11. A power control apparatus for controlling power consumption in customer premises equipment (CPE) for use in a content and data distribution network, the apparatus comprising:
- a detector in the CPE that is operative to determine an operational status of a connection between the CPE and a headend in the content and data distribution network;
- a controller coupled with the detector, the controller being operative to place the CPE in a first mode of operation when a power failure event is not present and the operational status is indicative of a loss of connectivity between the CPE and the headend; and
- switching circuitry coupled with the controller, the switching circuitry being operative in the first mode to disable power to a first subset of functional modules in the CPE to thereby reduce power consumption in the CPE,
- wherein the detector is operative to determine whether a power failure event is present at the CPE, and when the power failure event is present and when the operational status is indicative of a presence of connectivity between the CPE and the headend, the controller is operative to place the CPE in a second mode of operation, wherein in the second mode of operation, power to a second subset of functional modules in the CPE is disabled, the first subset of functional modules being greater than the second subset of functional modules.

12. The apparatus of claim 11, wherein the detector is operative to determine whether a power failure event is present at the CPE, and when a power failure event is detected, the switching circuitry is operative to power the CPE from an uninterruptable power source.

13. The apparatus of claim 12, wherein the uninterruptable power source comprises a battery.

14. The apparatus of claim 12, wherein the uninterruptable power source resides within the CPE.

15. The apparatus of claim 11, wherein the detector is operative to determine the operational status of the connection between the CPE and the headend by monitoring at least one characteristic of the connection between the CPE and the headend.

16. The apparatus of claim 15, wherein the at least one characteristic of the connection comprises at least one of data traffic, voice traffic, a Data Over Cable System Interface Standard (DOCSIS) channel carrier, and out-of-band messaging signals.

17. The apparatus of claim 11, wherein the detector is operative to periodically monitor at least one characteristic of the connection between the CPE and the headend.

18. The apparatus of claim 17, further comprising timing circuitry coupled with the detector, the timing circuitry being operative to control at least one of an amount of time the connection is monitored and an amount of time between successive connection monitoring intervals.

* * * * *